US012614067B2

(12) United States Patent
Mankowitz et al.

(10) Patent No.: US 12,614,067 B2
(45) Date of Patent: Apr. 28, 2026

(54) ROBUST REINFORCEMENT LEARNING FOR CONTINUOUS CONTROL WITH MODEL MISSPECIFICATION

(71) Applicant: GDM Holding LLC, Mountain View, CA (US)

(72) Inventors: Daniel J. Mankowitz, St. Albans (GB); Nir Levine, Sunnyvale, CA (US); Rae Chan Jeong, New York (CA); Abbas Abdolmaleki, London (GB); Jost Tobias Springenberg, London (GB); Todd Andrew Hester, Seattle, WA (US); Timothy Arthur Mann, Harpenden (GB); Martin Riedmiller, Balgheim (DE)

(73) Assignee: GDM Holding LLC, Mountain View, CA (US)

( * ) Notice: Subject to any disclaimer, the term of this patent is extended or adjusted under 35 U.S.C. 154(b) by 1119 days.

(21) Appl. No.: 17/620,164

(22) PCT Filed: Jun. 17, 2020

(86) PCT No.: PCT/EP2020/066755
§ 371 (c)(1),
(2) Date: Dec. 17, 2021

(87) PCT Pub. No.: WO2020/254400
PCT Pub. Date: Dec. 24, 2020

(65) Prior Publication Data
US 2022/0343157 A1     Oct. 27, 2022

Related U.S. Application Data

(60) Provisional application No. 62/862,616, filed on Jun. 17, 2019.

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ................................ G06N 3/08; G06N 3/045
See application file for complete search history.

(56) References Cited

U.S. PATENT DOCUMENTS

| | | | |
|---|---|---|---|
| 10,960,539 B1 * | 3/2021 | Kalakrishnan | ......... B25J 9/1679 |
| 11,453,121 B2 * | 9/2022 | Sermanet | ............... B25J 9/1697 |
| 2019/0155969 A1 * | 5/2019 | Haaland | .................. G06F 17/18 |

FOREIGN PATENT DOCUMENTS

| | | | | |
|---|---|---|---|---|
| EP | 3525136 A1 * | 8/2019 | ............. | G06N 3/006 |
| WO | WO-2017139507 A1 * | 8/2017 | ............. | G06N 3/042 |

OTHER PUBLICATIONS

Schulman et al., "Equivalence between policy gradients and soft q-learning," CoRR, Apr. 2017, arXiv:1704.06440, 15 pages (Year: 2017).*

(Continued)

*Primary Examiner* — Mariela Reyes
(74) *Attorney, Agent, or Firm* — Fish & Richardson P.C.

(57) ABSTRACT

Methods, systems, and apparatus, including computer programs encoded on computer storage media, for training a policy neural network having policy parameters. One of the methods includes sampling a mini-batch comprising one or more observation-action-reward tuples generated as a result of interactions of a first agent with a first environment; determining an update to current values of the Q network parameters by minimizing a robust entropy-regularized temporal difference (TD) error that accounts for possible perturbations of the states of the first environment represented by the observations in the observation-action-reward tuples;

(Continued)

and determining, using the Q-value neural network, an update to the policy network parameters using the sampled mini-batch of observation-action-reward tuples.

20 Claims, 4 Drawing Sheets

(56) References Cited

OTHER PUBLICATIONS

Dai et al., "From Credit Assignment to Entropy Regularization: Two New Algorithms for Neural Sequence Prediction," CoRR, Apr. 2018, arxiv.org/abs/1804.10974, 19 pages (Year: 2018).*

Abdolmaleki et al., "Maximum a posteriori policy optimisation, " CoRR, Jun. 2018, arXiv:1806.06920, 23 pages.

Abdolmaleki et al., "Relative entropy regularized policy iteration," CoRR, Dec. 2018, arxiv.org/abs/1812.02256. 23 pages.

Andrychowicz et al., "Learning dexterons in-hand manipulation," The International Journal of Robotics Research, Nov. 2019, 18 pages.

Braun et al., "Path integral control and bounded rationality," 2011 IEEE Symposium on Adaptive Dynamic Programming and Reinforcement Learning, Apr. 2011, pp. 202-209.

Christiano et al., "Transfer from simulation to real world through learning deep inverse dynamics model," CoRR, Oct. 2016, arxiv. org/abs/1610.03518, 8 pages.

Dai et al., "From Credit Assignment to Entropy Regularization: Two New Algorithms for Neural Sequence Prediction," CoRR, Apr. 2018, arxiv.org/abs/1804.10974, 19 pages.

Derman et al., "Soft-robust actor-critic policy-gradient," CoRR, Mar. 2018, arXiv:1803.04848, 17 pages.

Devin et al., "Learning modular neural network policies for multi-task and multi-robot transfer," 2017 IEEE International Conference on Robotics and Automation, Jun. 2017, pp. 2169-2176.

Di Castro et al., "Policy gradients with variance related risk criteria," CoRR, Jun. 2012, arXiv:1206.6404, 8 pages.

Duan et al., "Benchmarking deep reinforcement learning for continuous control, " Proceedings of The 33rd International Conference on Machine Learning, 2016, 48:1329-1338.

Dulac-Arnold et al., "Challenges of real-world reinforcement learning," CoRR, Apr. 2019, arxiv.org/abs/1904.12901, 13 pages.

Fox et al., "G-learning: Taming the noise in reinforcement learning via soft updates," CoRR, Dec. 2015, arxiv.org/abs/1512.08562, 11 pages.

Gao, "Machine learning applications for data center optimization," Google, 2014, 13 pages.

Gran-Moya et al., "Planning with informationprocessing constraints and model uncertainty in markov decision processes," CoRR, Sep. 2016, arxiv.org/abs/1604.02080, pp. 475-491.

Haarnoja et al., "Soft actor-critic algorithms and applications," CoRR, Dec. 2018, arxiv.org/abs/1812.05905, 17 pages.

Heess et al., "Learning continuous control policies by stochastic value gradients," Advances in Neural Information Processing Systems 28, 2015, 9 pages.

International Preliminary Report on Patentability in International Appln. No. PCT/EP2020/066755, dated Dec. 30, 2021, 9 pages.

International Serach Report and Written Opinion in International Appln. No. PCT/EP2020/066755, dated Sep. 23, 2020, 14 pages.

Iyengar, "Robust dynamic programming," Mathematics of Operations Research, May 2005, 30(2):257-280.

Kalashnikov et al., "Scalable deep reinforcement learning for vision-based robotic manipulation," Proceedings of The 2nd Conference on Robot Learning, 87:651-673.

Kingma et al., "Anto-encoding variational bayes," CoRR, Dec. 2013, arXiv: 1312.6114, 14 pages.

Mankowitz et al., "A bayesian approach to robust reinforcement learning," Proceedings of The 35th Uncertainty in Artificial Intelligence Conference, 2020, 115:648-658.

Mankowitz et al., "Learning robust options," Thirty-Second AAAI Conference on Artificial Intelligence, 2018, 32(1):6409-6416.

Mankowitz et al., "Unicorn: Continual learning with a universal, off-policy agent," CoRR, Feb. 2018, arxiv.org/abs/ 1802.08294, 17 pages.

Mnih et al., "Human-level control through deep reinforcement learning," Nature, Feb. 2015, 518(7540):529-533.

Nachum et al., "Bridging the gap between value and policy based reinforcement learning," Advances: in Neural Information Processing Systems, 2017, pp. 2775-2785.

Nilim et al., "Robust control of markov decision processes with uncertain transition matrices," Operations Research, Oct. 2005, 53(5):780-798.

Peng et al., "Sim-to-real transfer of robotic control with dynamics randomization," 2018 IEEE International Conference on Robotics and Automation, May 2018, pp. 1-8.

Rastogi et al., "Sample-efficient reinforcement learning via difference models," Third Machine Learning in Planning and Control of Robot Motion Workshop at ICRA, 2018, 6 pages.

Rezende et al., "Stochastic backpropagation and approximate inference in deep generative models," Proceedings of the 31st International Conference on Machine Learning, 2014, 32(2):1278-1286.

Riedmiller et al., "Learning by playingsolving sparse reward tasks from scratch," Proceedings of the 35th International Conference on Machine Learning, 2018, 80:4344-4353.

Rubin et al., "Trading value and information in MDPs," Decision Making with Imperfect Decision Makers, 2012, 16 pages.

Rusu et al., "Policy distillation," CoRR, Nov. 2015, arxiv.org/abs/ 1511.06295, 13 pages.

Schulman et al., "Equivalence between policy gradients and soft q-learning," CoRR, Apr. 2017, arXiv:1704.06440, 15 pages.

shadowrobot.com [online], "Shadow Dexterous Hand Technical Specification," Sep. 2020, retrieved on Mar. 16, 2022, retrieved from URL<https://www.shadowrobot.com/wp-content/uploads/ shadow dexterous hand technical specification E 20190221.pdf/> 13.

Tamar et al., "Scaling up robust mdps using function approximation," International Conference on Machine Learning, 2014, pp. 181-189.

Tassa et al., "Deepmind control suite," CoRR, Jan. 2018, arxiv.org/ abs/1801.00690, 24 pages.

Teh et al., "Distral: Robust multitask reinforcement learning," Advances in Neural Information Processing Systems 30, 2017, 11 pages.

Tessler et al., "A deep hierarchical approach to lifelong learning in minecraft," Thirty-First AAAI Conference on Artificial Intelligence, 2017, 31(1):1553-1561.

Wiesemann et al., "Robust Markov Decision Processes," Math. Oper. Res., Nov. 2012, 38(1):153-183.

Office Action in European Appln. No. 20733750.2, dated Nov. 7, 2023, 9 pages.

* cited by examiner

200

Sample mini-batch                                                202

Determine update to current values of Q network
parameters                                                      204

Determine update to current values of policy parameters         206

300

Identify observation and a plurality of next observations — 302

Determine Q value for observation — 304

Determine entropy-regularized Q values for perturbed next states — 306

Determine robust entropy-regularized TD error — 308

400

Determine next probability distribution for next perturbed state — 402

Sample next action from next probability distribution — 404

Determine Q value — 406

Determine entropy regularization penalty — 408

Determine entropy-regularized Q value — 410

ROBUST REINFORCEMENT LEARNING FOR CONTINUOUS CONTROL WITH MODEL MISSPECIFICATION

CROSS-REFERENCE TO RELATED APPLICATION

This application is a National Stage Application under 35 U.S.C. § 371 and claims the benefit of International Application No. PCT/EP2020/066755, filed Jun. 17, 2020, which claims priority to U.S. Application No. 62/862,616, filed Jun. 17, 2019, entitled ROBUST REINFORCEMENT LEARNING FOR CONTINUOUS CONTROL WITH MODEL MISSPECIFICATION, the disclosure of which is incorporated herein by reference.

BACKGROUND

This specification relates to controlling agents using neural networks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both. Each layer of the network generates an output from a received input in accordance with current values of a respective set of parameters.

SUMMARY

This specification describes a system implemented as one or more computer programs on one or more computers in one or more locations that trains a policy neural network. The policy neural network is used to control an agent in order to cause the agent to perform a particular task in an environment. For example, the agent may be a robot and the task may be an industrial robotic task that involves navigating in the environment, moving objects in the environment, or both.

In particular, the system trains the policy neural network so that the policy defined by outputs of the policy neural network is robust to perturbations in the environment that naturally occur when the test time or inference environment is different from the environment where the agent was trained. For example, perturbations in the environment can occur when the agent was trained in simulation and then deployed in a real-world environment or when the agent is trained in one real-world environment and then needs to be deployed in a different real-world environment.

In one aspect there is described a method of training a policy neural network having a plurality of policy network parameters. The policy neural network is configured to receive a policy input comprising an observation characterizing a current state of an environment and to process the network input in accordance with the policy network parameters to generate a policy output that defines a probability distribution over a space of possible actions to be performed by an agent interacting with the environment. The policy neural network is trained jointly with a Q-value neural network (i) having a plurality of Q network parameters and (ii) configured to receive a Q network input comprising data identifying an action and the observation and to process the Q network input in accordance with the Q network parameters to generate a Q value for the action.

The method comprises sampling a mini-batch comprising one or more observation-action-reward tuples generated as a result of interactions of a first agent with a first environment; determining an update to current values of the Q network parameters by minimizing a robust entropy-regularized temporal difference (TD) error that accounts for possible perturbations of the states of the first environment represented by the observations in the observation-action-reward tuples; and determining, using the Q-value neural network (i.e. using one or values from the Q-value neural network), an update to the policy network parameters using the sampled mini-batch of observation-action-reward tuples.

The trained policy neural network may be used for controlling a second agent interacting with a second, different environment.

In some implementations the robust entropy-regularized temporal difference (TD) error measures, for each tuple, an error between (i) a sum of the reward in the tuple and an infimum or average of Q-values, e.g. entropy-regularized Q values, for perturbed next states and (ii) a Q value for the observation-action pair in the tuple. Each perturbed next state may represent a perturbation of the (first) environment, more specifically a result of performing an action in the tuple in a perturbed version of the environment. This approach provides robustness, or soft-robustness, respectively, for the trained policy neural network to modifications of the environment.

Determining an update to current values of the Q network parameters may comprise, for each tuple and for each of a plurality of possible perturbations of the (first) environment in a set of possible perturbations, causing the agent to perform the action in the tuple when the state of the environment represented by the observation in the tuple has been perturbed by applying the possible perturbation to the state of the environment represented by the observation, and in response, obtaining a next observation characterizing a perturbed next state.

There are various ways in which an entropy-regularized Q value may be generated. For example this may comprise processing the next observation characterizing the perturbed next state using the policy neural network to generate a next probability distribution over possible actions, sampling a next action from the next probability distribution, determining a Q value for the next observation-next action pair, determining an entropy regularization penalty based on a divergence between the next probability distribution and a reference next probability distribution; and determining the respective entropy-regularized Q value for the perturbed next state from at least the Q value for the next observation-next action pair and the entropy regularization penalty. In some implementations, but not necessarily, the reference next probability distribution may be an "old" probability distribution i.e. generated by the policy neural network in accordance with earlier values of the policy parameters, to penalize large policy deviations and prevent early convergence to local, sub-optimal policies.

Particular embodiments of the subject matter described in this specification can be implemented so as to realize one or more of the following advantages.

Reinforcement learning agents are typically trained in a single environment, e.g., in a simulator or in a single physical location. As a consequence, an issue that is faced by many of these agents is the sensitivity of the agent's policy to environment perturbations. Perturbing the dynamics of the environment during test time, which may include executing the policy in a real-world setting after the policy has been learned in simulation, can have a significant negative impact on the performance of the agent. In other words, policies learned using conventional techniques are not robust to perturbations in the environment that naturally occur when the test time (or inference) environment is different from the environment where the agent was trained, e.g., when the agent was trained in simulation and then deployed in a real-world environment or when the agent is trained in one real-world location and then needs to be deployed in a different real-world environment. This is because the training environment is not necessarily a very good model of the perturbations that an agent may actually face, leading to potentially unwanted, sub-optimal behavior. There are many types of environment perturbations that may cause policies to perform poorly. These include changing lighting/weather conditions, sensor noise, actuator noise, action delays, and so on.

By training the policy network as described in this specification, the policy neural network becomes robust to environment perturbations. This is especially crucial, e.g., in the Sim2Real (simulation to real-world) setting where a policy is trained in a simulator and then executed on a real-world domain. As an example, consider a robotic arm that executes a control policy to perform a task in a factory. If, for some reason, the arm needs to be replaced and the specifications do not exactly match those of the arm that was used during training, then the control policy still needs to be able to perform the task with the 'perturbed' robotic arm dynamics. In addition, sensor noise due to malfunctioning sensors, as well as actuator noise, may benefit from a robust policy to deal with these noise-induced perturbations.

In this specification, training an agent in one environment and then deploying the agent in a different, perturbed version of the environment (as in the above examples) is referred to as model misspecification. By incorporating robustness into agents as described in this specification, the system corrects for this misspecification yielding improved performance in the perturbed environment(s).

Moreover, because of the way that the policy network is trained, the resulting trained policy may become robust to perturbations that are different from those that were considered during the training. That is, the trained policy can generalize to be robust to perturbations beyond those that were encountered during training.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
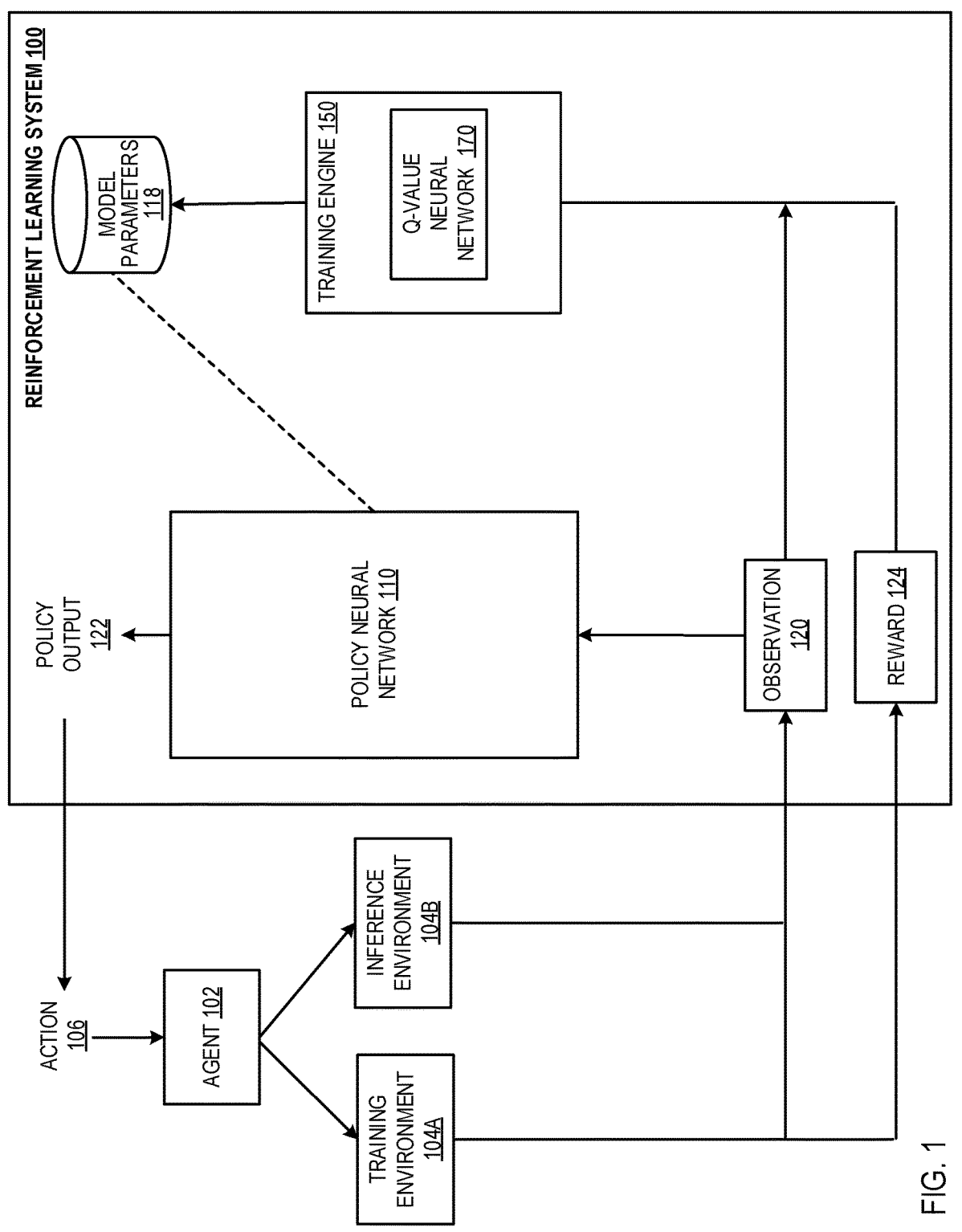
FIG. 1 shows an example reinforcement learning system.

This specification describes a system implemented as computer programs on one or more computers in one or more locations that trains a policy neural network that is used to control an agent, i.e., to select actions to be performed by the agent while the agent is interacting with an environment, in order to cause the agent to perform a specified task.

The agent can be, e.g., a robot or an autonomous or semi-autonomous vehicle. For example, the tasks can include causing the agent to navigate to different locations in the environment, causing the agent to locate different objects, causing the agent to pick up different objects or to move different objects to one or more specified locations, and so on.

Each input to the policy neural network can include an observation characterizing the state of the environment being interacted with by the agent and the output of the policy neural network ("policy output") can define an action to be performed by the agent in response to the observation, e.g., an output that defines a probability distribution over possible actions to be performed by the agent.

The observations may include, e.g., one or more of: images, object position data, and sensor data to capture observations as the agent interacts with the environment, for example sensor data from an image, distance, or position sensor or from an actuator. For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot. In other words, the observations may similarly include one or more of the position, linear or angular velocity, force, torque or acceleration, and global or relative pose of one or more parts of the agent. The observations may be defined in 1, 2 or 3 dimensions, and may be absolute and/or relative observations. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

The actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g., steering, and movement e.g., braking and/or acceleration of the vehicle.

The system can then cause the agent to perform an action using the probability distribution, e.g., by sampling from the probability distribution or by selecting the highest-probability action.

In some cases, in order to allow for fine-grained control of the agent, the system may treat the space of actions to be performed by the agent, i.e., the set of possible control inputs, as a continuous space. Such settings are referred to as continuous control settings. In these cases, the output of the controller can be the parameters of a multi-variate probability distribution over the space, e.g., the means and covariances of a multi-variate Normal distribution.

FIG. 1 shows an example reinforcement learning system 100. The reinforcement learning system 100 is an example of a system implemented as computer programs on one or more computers in one or more locations in which the systems, components, and techniques described below are implemented.

The system 100 includes a policy neural network 110, a training engine 150, and one or more memories storing a set of policy parameters 118 of the policy neural network 110.

The system 100 controls an agent 102 interacting with an environment, e.g., a training environment 104a or an inference environment 104b, by selecting actions 106 to be performed by the agent 102 and then causing the agent 102 to perform the selected actions 106.

Performance of the selected actions 106 by the agent 102 generally causes the environment to transition into new states. By repeatedly causing the agent 102 to act in the environment, the system 100 can control the agent 102 to complete a specified task. For example, the task may be an industrial robotic task that involves navigating in the environment, moving objects in the environment, or both.

In particular, the reinforcement learning system 100 controls the agent 102 using a policy neural network 110 in order to cause the agent 102 to perform the specified task in the environment.

The policy neural network 110 is a neural network having parameters (referred to in this specification as "policy parameters") that receives an observation 120 characterizing a state of the environment 104 being interacted with by the agent 102 and generates a policy output 122 that defines a probability distribution over a set of possible actions that can be performed by the agent 102.

Each action in the set of possible actions is generally a multi-dimensional action, e.g., a multi-dimensional vector. For example, when the agent is a robot, each dimension can correspond to a different joint or motor of the agent 102 and can be a control input for the joint or motor, e.g., a torque to be applied to the joint or a position or setting for the motor. As one example, if the robot is controlled by eight actuator motors positioned at different points along the frame of the robot, each action will generally be an eight-dimensional vector, with each dimension corresponding to one of the eight motors and the value at that dimension being a desired motor position for that motor.

Generally, in order to allow for fine-grained control of the agent, the system 100 treats the space of actions to be performed by the agent, i.e., the set of possible control inputs, as a continuous space (a continuous control setting). In these cases, the policy output 122 of the policy neural network 110 can be the parameters of a multi-variate probability distribution over the space, e.g., the means and covariances of a multi-variate Normal distribution.

In some cases, however, the system can instead treat the space of actions as a discrete set of possible actions. When the set of actions is discrete, the policy output 122 can include a respective probability for each action in the set.

Generally, the observation 120 is generated from sensor data captured by sensors of the agent 102. For example, the observation 120 can include an observation that includes one or more sensor readings that characterize the current state of the agent 102, e.g., sensors that measure the angles of certain joints or motors of the agent 102, an IMU that measures orientation and angular velocity of the agent 102, and so on.

In some cases, the observation can also include an image captured by a camera sensor, laser data captured by a laser sensor, or both.

In some cases, the observation 120 includes additional data, e.g., one or more recently received observations in addition to the current observation, data specifying the most recent action performed by the robot, or data specifying the most recent reward 124 received by the system 100.

The policy neural network 110 can have any appropriate neural network architecture that allows the policy neural network 110 to map a received observation 120 to a policy output 122. For example, when the observations 120 include high-dimensional sensor data, e.g., images or laser data, the policy neural network 110 can be a convolutional neural network. As another example, when the observations 120 include only relatively lower-dimensional inputs, e.g., sensor readings that characterize the current state of the robot, the policy neural network 110 can be a multi-layer perceptron. As yet another example, when the observations 120 include both high-dimensional sensor data and lower-dimensional inputs, the policy neural network 110 can include a convolutional encoder that encodes the high-dimensional data, a fully-connected encoder that encodes the lower-dimensional data, and a policy subnetwork that operates on a combination, e.g., a concatenation, of the encoded data to generate the policy output 122.

The system 100 uses the policy output 122 to control the agent, i.e., to select the action 106 to be performed by the agent at the current time step in accordance with an action selection policy and then cause the agent robot to perform the action 106, e.g., by directly transmitting control signals to the robot or by transmitting data identifying the action 106 to a control system for the agent 102.

The system 100 can select the action to be performed by the agent 102 based on the action selection output 122 using any of a variety of action selection policies, e.g., by sampling an action in accordance with the probability values for the actions, or by selecting the action with the highest probability value.

During training, the system 100 can receive a respective reward 124 at each time step, where the reward 124 is specified by a scalar numerical value and characterizes, e.g., a progress of the agent 102 towards completing the specified task.

In order to improve the control of the agent 102, the training engine 150 repeatedly updates the policy parameters 118 of the policy neural network 110 based on interactions of the agent 102 with the training environment 104a to cause the policy neural network 110 to generate more accurate policy outputs, i.e., policy outputs that result in higher rewards 124 being received by system 100 and, as a result, improve the performance of the agent 102 on the desired task. In other words, the training engine 150 trains the policy neural network 110 by repeatedly updating the policy parameters 118.

Once the policy neural network 110 has been trained, the system 100 or another system can cause the agent 102 to perform the task in the inference environment 104b.

The inference environment 104b will generally be different from the training environment 104a. Thus, the training engine 150 will generally be training the policy neural network 110 in a different environment from the one in which the agent will be deployed after training. Although referred to as an inference environment, nonetheless further learning may take place in this environment.

For example, the training environment 104a can be a computer simulation of a real-world environment and the inference environment 104*b* can be the real-world environment. Thus, when acting in the inference environment 104*b*, the agent is a real-world mechanical agent, e.g., a robot or an autonomous or semi-autonomous vehicle, and during training, the agent is a simulation of the real-world mechanical agent.

As another example, the training environment 104*a* can be one real-world environment and the inference environment 104*b* can be a second, different real-world environment. For example, the training environment 104*a* can be one real-world, physical location while the inference environment 104*b* is a different physical location. In some of these cases, the agent during training and the agent at inference can be the same mechanical agent. In others of these cases, the agent during training can be one mechanical agent and the agent during inference can be a different mechanical agent, e.g., a robot having approximately the same specification as the robot used during training.

Because the training environment 104*a* and the inference environment 104*b* are different, perturbations in the environment can naturally occur even when the training environment 104*a* is modelled after the inference environment 104*b*. In other words, the inference environment 104*b* will often be a different, perturbed version of the training environment 104*a* because modelling the appearance and dynamics of the inference environment 104*b* exactly during training may not be feasible.

The training engine 150 trains the policy neural network 110 to account for this misspecification and to be robust to perturbations between the training and inference environments.

In particular, the training engine 150 trains the policy neural network 110 jointly with a Q-value neural network 170.

The Q-value neural network 170 is a neural network having parameters (referred to as "Q network parameters") and configured to receive a Q network input that includes data identifying an action and an observation 120 and to process the Q network input in accordance with the Q network parameters to generate a Q value for the action.

Like the policy neural network 110, the Q-value neural network 170 can have any appropriate neural network architecture that allows Q-value neural network 170 to map a received observation and action to a Q value. For example, when the observations 120 include high-dimensional sensor data, e.g., images or laser data, the Q-value neural network 170 can be or include a convolutional neural network. As another example, when the observations 120 include only relatively lower-dimensional inputs, e.g., sensor readings that characterize the current state of the robot, the Q-value neural network 170 can be a multi-layer perceptron. As yet another example, when the observations 120 include both high-dimensional sensor data and lower-dimensional inputs, the Q-value neural network 170 can include a convolutional encoder that encodes the high-dimensional data, a fully-connected encoder that encodes the lower-dimensional data, and a policy subnetwork that operates on a combination, e.g., a concatenation, of the encoded data to generate the Q value.

The Q value is an estimate of the return that would be received for the task if the agent performs the action in response to the observation. The return is generally a time-discounted combination, e.g., sum, of rewards for the task received by the system starting from the given observation, i.e., a combination in which rewards received time steps further in the future are discounted relative to rewards received at earlier time steps.

More specifically, the training engine 150 trains the policy neural network 110 and the Q-value neural network 170 using an actor critic reinforcement learning technique that uses a state-action value function, with the policy neural network 110 serving as the actor and the Q-value neural network 170 serving as the critic. The state-action value function measures the value (in terms of future received rewards) of taking a particular action when the environment is in a particular state. In particular, the state-action value function measures the return that would be received as a result of taking a particular action when the environment is in a particular state.

In an actor critic technique that uses a state-action value function, the actor is updated based on outputs generated by the critic and the critic is updated so that outputs of the critic more accurately estimate the state-action value function.

During the training, the training engine 150 modifies the updating of the critic, i.e., of the Q-value neural network 170, in an existing actor critic technique and uses the existing actor critic technique to update the actor, i.e., the policy neural network 110, using the critic, e.g., by performing a policy gradient update based on Q-values generated by the Q-value neural network.

More specifically, as will be described in more detail below with reference to FIGS. 2-4, the training engine 150 modifies the updating of the critic so that the policy defined by outputs of the trained policy neural network 110 is robust to perturbations in the environment that naturally occur when the test time or inference environment is different from the environment where the agent was trained.

One example of an existing actor critic technique that can be used to update the policy neural network 110 is Maximum a Posteriori Policy Optimisation (MPO). MPO is described in more detail in Abbas Abdolmaleki, Jost Tobias Springenberg, Yuval Tassa, Remi Munos, Nicolas Heess, and Martin Riedmiller. Maximum a posteriori policy optimisation. arXiv preprint arXiv:1806.06920, 2018b, the entire contents of which are hereby incorporated by reference herein in their entirety.

Another example of an existing actor critic technique that can be used to update the policy neural network 110 is stochastic value gradients (SVG). SVG is described in more detail in Nicolas Heess, Gregory Wayne, David Silver, Timothy Lillicrap, Tom Erez, and Yuval Tassa. Learning continuous control policies by stochastic value gradients. In Advances in Neural Information Processing Systems, pp. 2944-2952, the entire contents of which are hereby incorporated by reference herein in their entirety.

Training the policy neural network 110 is described in more detail below with reference to FIGS. 2-4.

More generally, while the above description describes training a policy neural network 110 that is used to control the agent using actor-critic techniques, in other implementations, the system instead trains the Q-value neural network 170 using a value-based technique, e.g., Q learning or a variant of Q learning, and uses the Q-value neural network 170 instead of the policy neural network 110 to control the agent. In these implementations, when a probability distribution over the set of actions is required, i.e., either for the training (as described below) or for controlling the agent (as described above), the system can map the Q values generated by the Q-value neural network 170 to a probability distribution, e.g., by applying a softmax function to the respective Q values for each of the actions in the set of actions. When controlling the agent, the system can instead directly use the Q values, e.g., by selecting the action with the highest Q value or applying an exploration policy to the Q values, e.g., epsilon-greedy.

Figure 2:
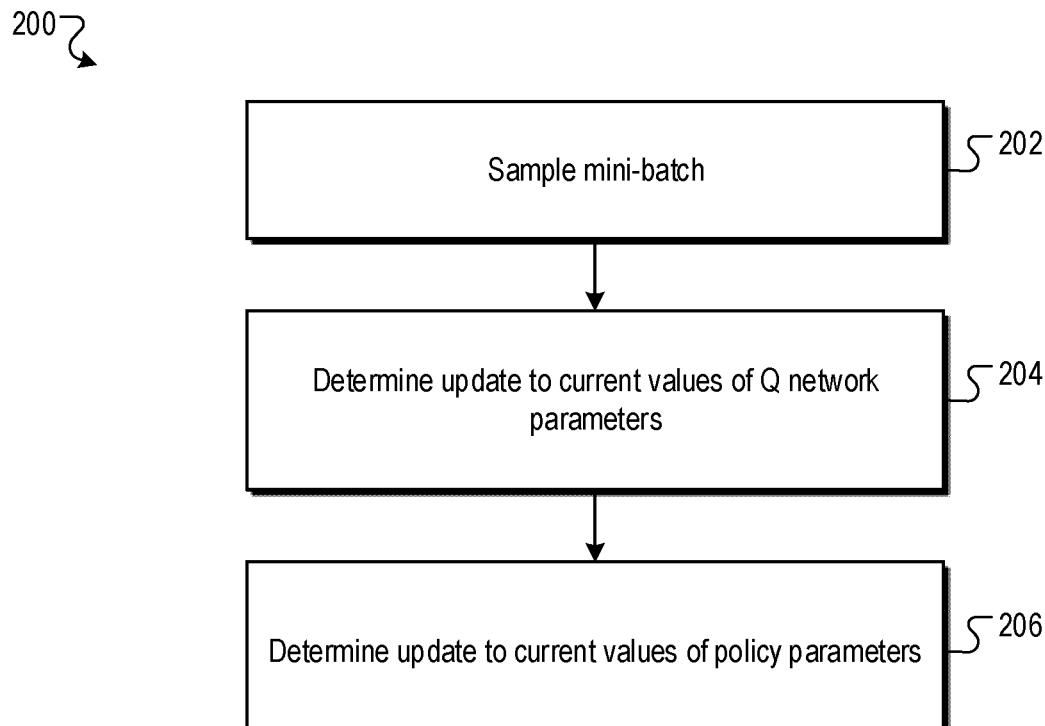
FIG. 2 is a flow diagram of an example process for training the policy neural network.

FIG. 2 is a flow diagram of an example process 200 for training the policy neural network. For convenience, the process 200 will be described as being performed by a system of one or more computers located in one or more locations. For example, a control system, e.g., the reinforcement learning system 100 of FIG. 1, appropriately programmed, can perform the process 200.

The system can repeatedly perform the process 200 on transitions, e.g., transitions sampled from a replay buffer or other memory that stores data generated as a result of the agent interacting with the training environment (while controlled by the policy neural network or by some other control policy), to train the policy neural network and the Q-value neural network.

The system samples a mini-batch of one or more transitions from the memory (step 202). A mini-batch is a subset of the transitions that are stored in memory that includes a fixed number, i.e., one or more, of transitions. For example, the system can sample the mini-batch, i.e., sample the fixed number of transitions that form the mini-batch, randomly or in accordance with a conventional prioritized experience replay sampling scheme. Each transition is an observation-action-reward tuple that identifies at least an observation characterizing a state of the training environment, an action performed by the agent when the training environment was in the state characterized by the observation, and a reward received in response to the agent performing the action.

As will be described below, in some cases, the tuple also identifies a plurality of next observations characterizing respective perturbed next states of the training environment after the agent performed the action. As will also be described below, in some other cases, the system generates or obtains the next observations after sampling the mini-batch.

The system determines an update to the current values of the Q network parameters by minimizing a robust entropy-regularized temporal difference (TD) error (step 204).

The robust entropy-regularized TD error is an error that accounts for possible perturbations of the states of the training environment represented by the observations in the observation-action-reward tuples.

In other words, instead of updating the Q network parameters using a conventional TD error as would be done in a conventional actor critic technique, the system instead updates the Q network parameters using the robust entropy-regularized TD error.

Determining a robust entropy-regularized TD error is described in more detail below with reference to FIG. 3.

In particular, the system determines, for each of the one or more transitions, a respective gradient of the robust entropy-regularized TD error with respect to the Q network parameters, i.e., by backpropagating the gradient of the error through the Q-value neural network.

The system then determines the update to the current values from the respective gradients, e.g., by averaging the gradients and then applying an optimizer, e.g., the stochastic gradient descent optimizer, the Adam optimizer, the rmsProp optimizer, or a learned optimizer, to the averaged gradients in order to determine the update to the current values of the Q network parameters.

The system then determines, using the Q network, an update to the policy network parameters using the sampled mini-batch of observation-action-reward tuples (step 206).

In particular, as described above, the system can use any actor-critic reinforcement learning technique in which the Q-value neural network serves as the critic and the policy neural network serves as the actor in order to update the policy network parameters.

The system then applies the update to the current values, e.g., by adding or subtracting the update to the current values, of the Q network parameters and the policy parameters.

Figure 3:
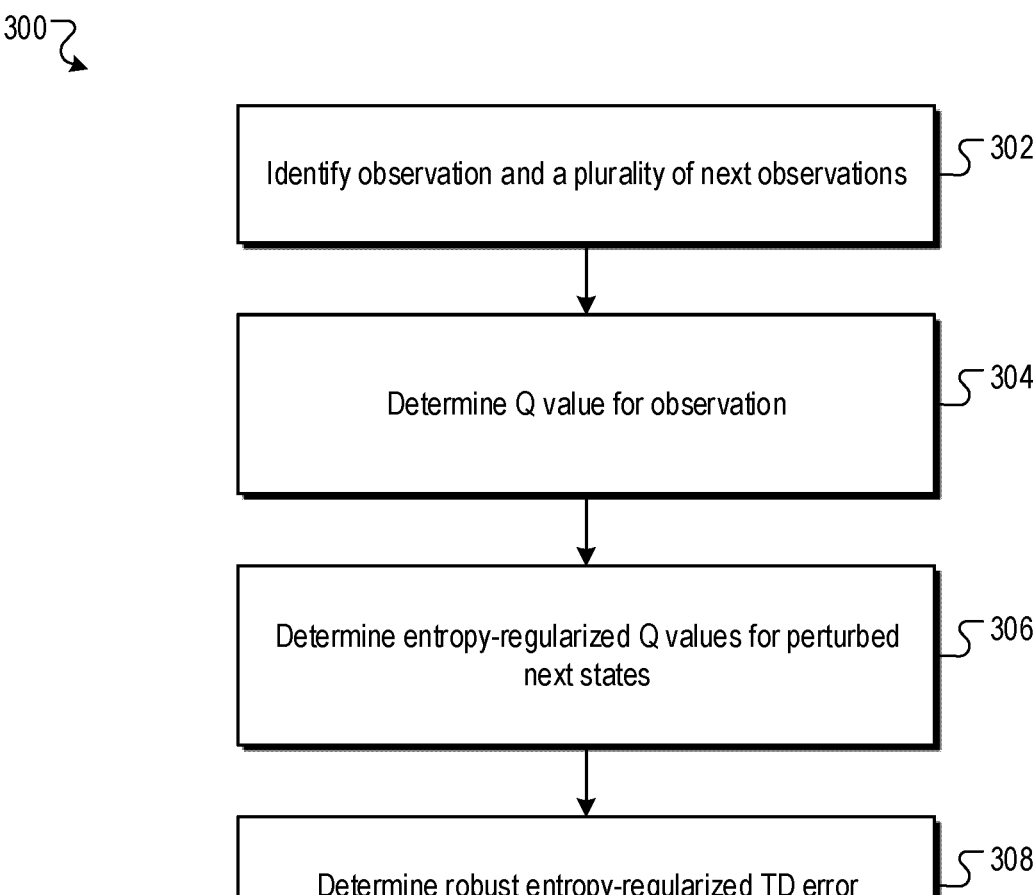
FIG. 3 is a flow diagram of an example process for determining a robust entropy-regularized TD error.

FIG. 3 is a flow diagram of an example process 300 for determining a robust entropy-regularized TD error. For convenience, the process 300 will be described as being performed by a system of one or more computers located in one or more locations. For example, a control system, e.g., the reinforcement learning system 100 of FIG. 1, appropriately programmed, can perform the process 300.

The system can perform the process 300 for each tuple in the sampled mini-batch to determine a respective robust entropy-regularized TD error for each of the tuples.

The system identifies an observation, i.e., the observation in the tuple, and a plurality of next observations each characterizing a respective perturbed next state of the environment (step 302)

In particular, for each of a plurality of possible perturbations of the environment in a set of possible perturbations, the system causes the agent to perform the action in the tuple when the state of the environment represented by the observation in the tuple has been perturbed by applying the possible perturbation to the state of the environment represented by the observation and, in response, obtains a next observation characterizing a perturbed next state of the environment.

In other words, the system maintains a set of possible perturbations that can be applied to any given state of the environment. The set of possible perturbations can be specific to the task that the agent is configured to perform and to the nature of the environment. For example, the perturbations may reflect aspects of the environment that are likely to change if the same task is performed in various different training and inference environments.

For example, the possible perturbations can include perturbations to one or more of: dimensions of portions of the agent or dimensions of objects in the environment, orientation of portions of the agent, or orientations of objects in the environment. For example, when the agent is a robotic arm, the system may maintain a set of length perturbations that can be applied to modify the current length of the robotic arm, a set of orientation perturbations that can be applied to modify the current orientation of the robotic arm, or both. Similar perturbations can be maintained for objects in the environment, i.e., objects interacted with by the agent.

For each of a plurality of those possible perturbations, the system applies or causes another system to apply the possible perturbation to the state of the environment represented by the observation in the tuple. For example, the system can apply each combination of possible perturbations or can randomly sample a fixed number of possible perturbations from the set of possible perturbations.

When the training environment is a simulated environment, for each possible perturbation, the system can modify the simulated state of the environment by modifying the currently rendered scene in the simulation to apply the possible perturbation.

When the training environment is a real-world environment, the system can instruct an automated agent or a human operator to modify the scene in the environment by applying the selected perturbation.

Once the state of the environment has been perturbed by applying the possible perturbation, the system causes the agent to perform the action in the tuple and, in response, obtains a next observation characterizing a perturbed next state of the environment, i.e., the state that the environment transitioned into as a result of the action being performed when the possible perturbation had been applied.

Thus, from the single observation in the tuple, the system obtains multiple next observations characterizing different perturbed next states.

In some implementations, the system applies the perturbations and causes the agent to act when training on the tuple, i.e., after sampling the mini-batch from the memory.

In other implementations, the system applies the perturbations and causes the agent to act prior to storing the tuple in the memory. In these implementations, at training time, the tuple that is obtained from the memory includes both the observation and the plurality of next observations, i.e., the system obtains both the observation and the corresponding set of next observations from the memory at training time.

The system determines a Q value for the observation-action pair in the tuple (step 304).

In particular, the system processes the observation in the tuple and the action in the tuple using the Q-value neural network and in accordance with the current values of the Q network parameters to generate the Q value for the observation-action pair.

The system determines a respective entropy-regularized Q value for each of the perturbed next states from the next observations for the perturbed next states (step 306).

Determining the entropy-regularized Q value for a given perturbed next state is described in more detail below with reference to FIG. 4.

The system then determines the robust entropy-regularized TD error for the tuple from the reward in the tuple, the Q value for the observation-action pair in the tuple, and the respective entropy-regularized Q value for each of the perturbed next states (step 308).

In some implementations, the robust entropy-regularized TD error for the tuple measures an error between (i) a sum of the reward in the tuple and an infimum of entropy-regularized Q values for the perturbed next states and (ii) a Q value for the observation-action pair in the tuple. For example, the TD error for the t-th tuple can be expressed as $$\left( r_t + \gamma \inf_{s'_p} \left( Q_{ER}(s'_p) \right) - Q(s_t, a_t) \right)^2,$$

where $r_t$ is the reward in the tuple, $\gamma$ is a discount factor, "inf" is an infimum over perturbed next states $s'_p$, where $s'_p$ is the perturbed next state corresponding to possible perturbation p, $Q_{ER}(p)$ is the entropy-regularized Q value for the perturbed next state $s'_p$ and $Q(s_t, a_t)$ is the Q value for the observation-action pair in the tuple. Thus, in these implementations, the TD error can be considered to be a "robust" or "hard-robust" error because it is measured with respect to the infimum of the entropy-regularized Q values, i.e., with respect to the smallest entropy-regularized Q value for any of the perturbed next states, thereby optimizing for the worst case expected return when perturbations are accounted for.

In some other implementations, the robust entropy-regularized TD error for the tuple is instead "soft-robust" error that measures an error between (i) a sum of the reward in the tuple and an average (i.e., instead of an infimum) of entropy-regularized Q values for the perturbed next states and (ii) a Q value for the observation-action pair in the tuple. For example, the TD error for the t-th tuple can be expressed as $$\left( r_t + \gamma \operatorname{avg}_{s'_p} \left( Q_{ER}(s'_p) \right) - Q(s_t, a_t) \right)^2,$$

where "avg" is an average over perturbed next states $s'_p$. Thus, in these implementations, the TD error can be considered to be a "soft-robust" error because it is measured with respect to the average of the entropy-regularized Q values, thereby optimizing for the average expected return when perturbations are accounted for.

Figure 4:
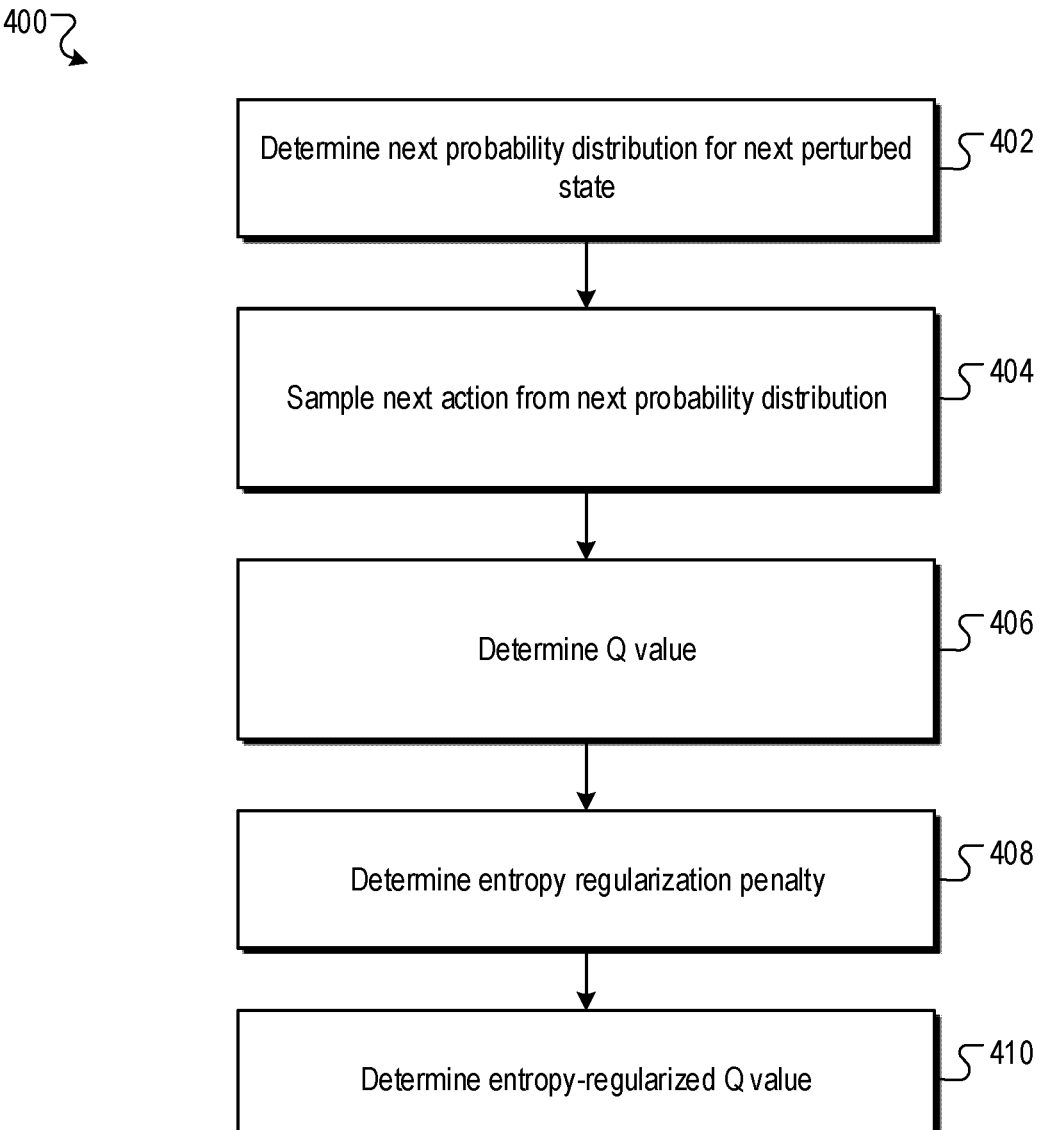
FIG. 4 is a flow diagram of an example process for determining an entropy-regularized Q value for a given perturbed next state.

FIG. 4 is a flow diagram of an example process 400 for determining an entropy-regularized Q value for a given perturbed next state. For convenience, the process 400 will be described as being performed by a system of one or more computers located in one or more locations. For example, a control system, e.g., the reinforcement learning system 100 of FIG. 1, appropriately programmed, can perform the process 400.

The system can repeat the process 400 for each of the perturbed next states to generate a respective entropy-regularized Q value for each of the perturbed next states.

The system processes the next observation characterizing the perturbed next state using the policy neural network to generate a next probability distribution over possible actions for the perturbed next state (step 402).

The system samples a next action from the probability distribution (step 404).

The system determines a Q value for the next observation-next action pair (step 406).

In some implementations, the system processes the next observation and the next action using the Q-value neural network and in accordance with the current values of the Q network parameters to generate the Q value for the next observation-next action pair.

In some other implementations, the system processes the next observation and the next action using a target Q-value neural network and in accordance with the current values of the parameters of the target Q network to generate the Q value for the next observation-next action pair.

The target Q neural network, when used, is a neural network having the same architecture as the Q-value neural network but parameter values that change more slowly during training than the Q network parameters. For example, the system can update the parameters of the target Q neural network to match the current values of the Q network parameters after every N iterations of the process 200, where N is an integer greater than one. As another example, the system can maintain the parameters of the target Q neural network as a moving average of the values of the Q network parameters during the training.

The system determines an entropy regularization penalty based on a divergence between the next probability distribution and a reference next probability distribution (step 408). For example, the divergence can be the Kullback-Leibler divergence between the next probability distribution and a reference next probability distribution.

The reference next probability distribution is a probability distribution over the possible actions that is generated based on the next observation but using a different policy from the current version of the policy neural network.

As a particular example, the reference next probability distribution can be generated by the policy neural network in accordance with earlier values of the policy parameters. In other words, the reference next probability distribution can be generated by processing the next observation using the policy neural network, but in accordance with earlier values of the policy parameters instead of the current values. For example, the earlier values can be the values after an earlier iteration of the process 200 or can be maintained as a moving average of the current values of the policy parameters as the training progresses.

The system determines the entropy-regularized Q value for the perturbed next state from at least the Q value for the next observation-next action pair and the entropy regularization penalty (step 410).

For example, the entropy-regularized Q value for the perturbed next state can be equal to the difference between (i) the Q value for the next observation-next action pair and (ii) the entropy regularization penalty weighted by a temperature parameter that controls the degree of entropy regularization that is applied. By incorporating the entropy regularization penalty into the computation of the Q value, the system can encourage exploration of the environment and help prevent early convergence to sub-optimal policies.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method of training a policy neural network having a plurality of policy network parameters, wherein the policy neural network is configured to receive a policy input comprising an observation characterizing a current state of an environment and to process the network input in accordance with the policy network parameters to generate a policy output that defines a probability distribution over a space of possible actions to be performed by an agent interacting with the environment, wherein the policy neural network is trained jointly with a Q-value neural network (i) having a plurality of Q network parameters and (ii) configured to receive a Q network input comprising data identifying an action and the observation and to process the Q network input in accordance with the Q network parameters to generate a Q value for the action, and wherein the method comprises:

sampling a mini-batch comprising one or more observation—action—reward tuples generated as a result of interactions of a first agent with a first environment;

determining an update to current values of the Q network parameters comprising:

for each tuple and for each possible perturbation of the environment in a set of a plurality of possible perturbations of the environment:

causing the agent to perform the action in the tuple when the state of the environment represented by the observation in the tuple has been perturbed by applying the possible perturbation to the state of the environment represented by the observation; and in response, obtaining a next observation characterizing a perturbed next state; and minimizing a robust entropy-regularized temporal difference (TD) error that accounts for possible perturbations of the states of the first environment represented by the observations in the sampled mini-batch of observation-action-reward tuples and measures, for each tuple, an error between (i) a target Q value determined based on the reward in the tuple and an infimum or average of entropy-regularized Q values for the perturbed next states for the plurality of possible perturbations and (ii) a Q value for the observation-action pair in the tuple; and determining, using the Q-value neural network, an update to the policy network parameters using the sampled mini-batch of observation-action-reward tuples.

2. The method of claim 1, further comprising:

providing data specifying the trained policy neural network for use in controlling a second agent interacting with a second, different environment.

3. The method of claim 2, wherein the first environment is a simulation of a real-world environment and the second, different environment is the real-world environment, wherein the first agent is a real-world mechanical agent, and wherein the first agent is a simulation of the second agent.

4. The method of claim 2, wherein the first environment is a first real-world environment and the second, different environment is a second, different real-world environment.

5. The method of claim 4, wherein the first agent is a first real-world mechanical agent and the second agent is a second, different real-world mechanical agent.

6. The method of claim 1, wherein the robust entropy-regularized temporal difference (TD) error measures, for each tuple, an error between (i) a sum of the reward in the tuple and an infimum of entropy-regularized Q values for the perturbed next states and (ii) a Q value for the observation-action pair in the tuple.

7. The method of claim 1, wherein the robust entropy-regularized temporal difference (TD) error measures, for each tuple, an error between (i) a sum of the reward in the tuple and an average of entropy-regularized Q values for the perturbed next states and (ii) a Q value for the observation-action pair in the tuple.

8. The method of claim 6, further comprising generating a respective entropy-regularized Q value for each of the perturbed next states, comprising:

processing the next observation characterizing the perturbed next state using the policy neural network to generate a next probability distribution over possible actions;

sampling a next action from the next probability distribution;

determining a Q value for the next observation-next action pair;

determining an entropy regularization penalty based on a divergence between the next probability distribution and a reference next probability distribution; and determining the respective entropy-regularized Q value for the perturbed next state from at least the Q value for the next observation-next action pair and the entropy regularization penalty.

9. The method of claim 8, wherein the reference next probability distribution is a probability distribution generated by the policy neural network in accordance with earlier values of the policy parameters.

10. The method of claim 8, wherein the Q value for the next observation-next action pair is generated by a target Q neural network having the same architecture as the Q-value neural network but parameter values that change more slowly during training than the Q network parameters.

11. The method of claim 1, wherein the possible perturbations include perturbations to one or more of: dimensions of portions of the agent or dimensions of objects in the environment, orientation of portions of the agent, or orientations of objects in the environment.

12. The method of claim 1, wherein the policy output comprises output parameters of a probability distribution over a continuous space of actions.

13. The method of claim 12, wherein the parameters are means and covariances of a multi-variate Normal distribution over the continuous space of actions.

14. The method of claim 1, wherein determining, using the Q network, an update to the policy network parameters using the sampled batch of observation—action—reward tuples comprises applying an actor-critic technique to the sampled batch using the Q network as a critic.

15. The method of claim 14, wherein the actor-critic technique is Maximum a Posteriori Policy Optimisation.

16. The method of claim 14, wherein the actor-critic technique is stochastic value gradients (SVG).

17. One or more non-transitory computer-readable storage media encoded with instructions that, when executed by one or more computers, cause the one or more computers to perform operations for training a policy neural network having a plurality of policy network parameters, wherein the policy neural network is configured to receive a policy input comprising an observation characterizing a current state of an environment and to process the network input in accordance with the policy network parameters to generate a policy output that defines a probability distribution over a space of possible actions to be performed by an agent interacting with the environment, wherein the policy neural network is trained jointly with a Q-value neural network (i) having a plurality of Q network parameters and (ii) configured to receive a Q network input comprising data identifying an action and the observation and to process the Q network input in accordance with the Q network parameters to generate a Q value for the action, and wherein the operations comprise:

sampling a mini-batch comprising one or more observation—action—reward tuples generated as a result of interactions of a first agent with a first environment;

determining an update to current values of the Q network parameters, comprising:

for each tuple and for each possible perturbation of the environment in a set of a plurality of possible perturbations of the environment:

causing the agent to perform the action in the tuple when the state of the environment represented by the observation in the tuple has been perturbed by applying the possible perturbation to the state of the environment represented by the observation; and in response, obtaining a next observation characterizing a perturbed next state; and minimizing a robust entropy-regularized temporal difference (TD) error that accounts for possible perturbations of the states of the first environment represented by the observations in the sampled mini-batch of observation—action—reward tuples and measures, for each tuple, an error between (i) a target Q value determined based on the reward in the tuple and an infimum or average of entropy-regularized Q values for the perturbed next states for the plurality of possible perturbations and (ii) a Q value for the observation-action pair in the tuple; and determining, using the Q-value neural network, an update to the policy network parameters using the sampled mini-batch of observation-action-reward tuples.

18. A system comprising one or more computers and one or more storage devices storing instruction that when executed by one or more computers cause the one or more computers to perform operations fort raining a policy neural network having a plurality of policy network parameters, wherein the policy neural network is configured to receive a policy input comprising an observation characterizing a current state of an environment and to process the network input in accordance with the policy network parameters to generate a policy output that defines a probability distribution over a space of possible actions to be performed by an agent interacting with the environment, wherein the policy neural network is trained jointly with a Q-value neural network (i) having a plurality of Q network parameters and (ii) configured to receive a Q network input comprising data identifying an action and the observation and to process the Q network input in accordance with the Q network parameters to generate a Q value for the action, and wherein the operations comprise:

sampling a mini-batch comprising one or more observation—action—reward tuples generated as a result of interactions of a first agent with a first environment;

determining an update to current values of the Q network parameters, comprising:

for each tuple and for each possible perturbation of the environment in a set of a plurality of possible perturbations of the environment:

causing the agent to perform the action in the tuple when the state of the environment represented by the observation in the tuple has been perturbed by applying the possible perturbation to the state of the environment represented by the observation; and in response, obtaining a next observation characterizing a perturbed next state; and minimizing a robust entropy-regularized temporal difference (TD) error that accounts for possible perturbations of the states of the first environment represented by the observations in the sampled mini-batch of observation—action—reward tuples and measures, for each tuple, an error between (i) a target Q value determined based on the reward in the tuple and an infimum or average of entropy-regularized Q values for the perturbed next states for the plurality of possible perturbations and (ii) a Q value for the observation-action pair in the tuple; and determining, using the Q-value neural network, an update to the policy network parameters using the sampled mini-batch of observation—action—reward tuples.

19. The system of claim 18, wherein the robust entropy-regularized temporal difference (TD) error measures, for each tuple, an error between (i) a sum of the reward in the tuple and an infimum of entropy-regularized Q values for the perturbed next states and (ii) a Q value for the observation-action pair in the tuple.

20. The system of claim 18, wherein the robust entropy-regularized temporal difference (TD) error measures, for each tuple, an error between (i) a sum of the reward in the tuple and an average of entropy-regularized Q values for the perturbed next states and (ii) a Q value for the observation-action pair in the tuple.

* * * * *